(12) United States Patent
Sandeep et al.

(10) Patent No.: US 9,530,093 B2
(45) Date of Patent: *Dec. 27, 2016

(54) SOLVING VEHICLE ROUTING PROBLEMS USING EVOLUTIONARY COMPUTING TECHNIQUES

(71) Applicant: International Business Machines Corporation, Armonk, NY (US)

(72) Inventors: Vedula S. Sandeep, Hyderabad (IN); Sanjay K. Singh, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/055,668

(22) Filed: Feb. 29, 2016

(65) Prior Publication Data

US 2016/0171366 A1 Jun. 16, 2016

Related U.S. Application Data (63) Continuation of application No. 14/311,387, filed on Jun. 23, 2014.

(51) Int. Cl.
  *G06N 3/12* (2006.01)
  *G06N 3/00* (2006.01)
  *G06F 17/30* (2006.01)

(52) U.S. Cl.
  CPC ......... *G06N 3/126* (2013.01); *G06F 17/30958* (2013.01); *G06N 3/006* (2013.01)

(58) Field of Classification Search
  None
  See application file for complete search history.

(56) References Cited

U.S. PATENT DOCUMENTS 8,103,532 B2 1/2012 Kenefic
8,112,300 B2 2/2012 Harper
(Continued)

FOREIGN PATENT DOCUMENTS

CN 104700160 A 6/2015
CN 104951850 A 9/2015

OTHER PUBLICATIONS

Reimann, M., S. Shtovba, and E. Nepomuceno. "A hybrid ACO-GA approach to solve Vehicle Routing Problems." Student Papers of the Complex Systems Summer School, Budapest, Santa Fe Institute (2001).*

(Continued)

*Primary Examiner* — Kakali Chaki
*Assistant Examiner* — Daniel Pellett
(74) *Attorney, Agent, or Firm* — Robert C. Bunker (57) ABSTRACT

According to one exemplary embodiment, a method for solving combinatorial optimization problems is provided. The method may include receiving a plurality of problem instance parameters associated with a graph. The method may also include determining a dynamic path change indicator exists. The method may then include initializing the graph based on the determining the dynamic path change indicator does not exist. The method may further include inserting a placeholder node and at least one placeholder node edge based on the determining the dynamic path change indicator exists. The method may also include reinitializing the graph with the inserted place holder node and the at least one placeholder node edge. The method may then include initializing the reinitialized graph. The method may further include executing a hybrid algorithm on the initialized graph or on the reinitialized graph, wherein the hybrid algorithm comprises an ant colony optimization algorithm and a genetic algorithm.

1 Claim, 4 Drawing Sheets (56) References Cited

U.S. PATENT DOCUMENTS

2004/0143560 A1    7/2004    Zhu
2008/0144074 A1    6/2008    Lin
2015/0371135 A1    12/2015    Sandeep et al.

OTHER PUBLICATIONS

Kheirkhahzadeh, Masoumeh, and Ahmad Abdollahzadeh Barforoush. "A hybrid algorithm for the vehicle routing problem." 2009 IEEE Congress on Evolutionary Computation. IEEE, 2009.*

Chitty, Darren M., and Marcel L. Hernandez. "A hybrid ant colony optimisation technique for dynamic vehicle routing." Genetic and Evolutionary Computation Conference. Springer Berlin Heidelberg, 2004.*

Mazzeo, Silvia, and Irene Loiseau. "An ant colony algorithm for the capacitated vehicle routing." Electronic Notes in Discrete Mathematics 18 (2004): 181-186.*

Lee, Chou-Yuan, et al. "An enhanced ant colony optimization (EACO) applied to capacitated vehicle routing problem." Applied Intelligence 32.1 (2010): 88-95.*

Rizzoli, A. E., et al. "Ant Colony Optimisation for vehicle routing problems: from theory to applications." Galleria Rassegna Bimestrale Di Cultura 9.1 (2004): 1-50.*

Venkatesan, S., and S. Srinivasa Rao Madane. "Face recognition system with genetic algorithm and ANT colony optimization." International Journal of Innovation, Management and Technology 1.5 (2010): 469.*

Toth, Paolo, and Daniele Vigo. "Models, relaxations and exact approaches for the capacitated vehicle routing problem." Discrete Applied Mathematics 123.1 (2002): 487-512.*

Bin et al., "An Improved Ant Colony Optimization for Vehicle Routing Problem," European Journal of Operational Research, 2009, p. 171-176, vol. 196, Issue 1.

Chitty et al., "A Hybrid Ant Colony Optimisation Technique for Dynamic Vehicle Routing," Genetic and Evolutionary Computation (GECCO). 2004, p. 48-59, LNCS 3102, QinetiQ Ltd., Springer-Verlag Berlin Heidelberg.

Gambardella et al., "Ant Colony Optimization for Vehicle Routing in Advanced Logistics Systems," Proceedings of MAS—International Workshop on Modelling and Applied Simulation, 2003, 6 Pages, Bergeggi, Italy.

Mazzeo et al., "An Ant Colony Algorithm for the Capacitated Vehicle Routing," Electronic Notes in Discrete Mathematics, Dec. 2004, p. 1-2, Abstract Only, http://www.sciencedirect.com/science/article/pii/S1571065304010868, Accessed on Feb. 6, 2014.

Lee et al., "An Enhanced Ant Colony Optimization (EACO) Applied to Capacitated Vehicle Routing Problem," Appl Intell, 2010, p. 88-95, vol. 32, Springer Science+Business Media, LLC.

Reimann et al., "A Hybrid ACO-GA Approach to Solve Vehicle Routing Problems," CSSS Proceedings, 2001, 8 Pages, Santa Fe Institute Complex Systems Summer School, Budapest, Hungary.

Rice, "Computational Intelligence Algorithms for Optimized Vehicle Routing Applications in Geographic Information Systems," The University of Georgia Thesis Proposal, 2004, p. 1-21.

Rizzoli et al., "Ant Colony Optimisation for Vehicle Routing Problems: From Theory to Applications," IDSIA Technical Report TR-15-04, 2004, p. 1-50, Istituto Dalle Molle di Studi sull'Intelligenza Artificiale, Switzerland.

Shukla et al., "A Guided Learning Algorithm for Solving the Traveling Salesman Problem," Proceedings of the 2011 International Conference on Artificial Intelligence (ICAI) WorldComp'11, 2011, 6 Pages, vol. 1, Las Vegas, Nevada.

IBM, "List of IBM Patents or Patent Applications Treated as Related (Appendix P)," Jun. 7, 2016, p. 1-2.

* cited by examiner

SOLVING VEHICLE ROUTING PROBLEMS USING EVOLUTIONARY COMPUTING TECHNIQUES

BACKGROUND

The present invention relates generally to the field of computing, and more particularly to combinatorial optimization.

In many real-world scenarios, finding optimal solutions to complex problems through exhaustive searching is not feasible. One real-world scenario, for example, may be determining the optimal way to deliver packages by truck. Optimal package delivery has been framed generically as the vehicle routing problem. The vehicle routing problem describes a scenario where a fleet of trucks leave a depot and must reach every delivery destination exactly one time and return to the depot at the conclusion of each truck's route. Additional constraints may be introduced to the vehicle routing problem such as accounting for the carrying capacity of the delivery vehicles generating a scenario known as the capacitated vehicle routing problem. Determining optimal routes to solve complex problems such as the capacitated vehicle routing problem may not be resolved using standard analytical techniques within practical computational or temporal limits.

SUMMARY

According to one exemplary embodiment, a method for solving combinatorial optimization problems is provided. The method may include receiving a plurality of problem instance parameters associated with a graph. The method may also include determining when a dynamic path change indicator exists. The method may then include initializing the graph based on the determining the dynamic path change indicator does not exist. The method may further include inserting a placeholder node and at least one placeholder node edge based on the determining the dynamic path change indicator does exist. The method may also include reinitializing the graph with the inserted place holder node and the at least one placeholder node edge. The method may then include initializing the reinitialized graph. The method may further include executing a hybrid algorithm on the initialized graph or on the reinitialized graph, wherein the hybrid algorithm comprises an ant colony optimization algorithm and a genetic algorithm.

According to another exemplary embodiment, a computer system for solving combinatorial optimization problems is provided. The computer system may include one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method. The method may include receiving a plurality of problem instance parameters associated with a graph. The method may also include determining when a dynamic path change indicator exists. The method may then include initializing the graph based on the determining the dynamic path change indicator does not exist. The method may further include inserting a placeholder node and at least one placeholder node edge based on the determining the dynamic path change indicator does exist. The method may also include reinitializing the graph with the inserted place holder node and the at least one placeholder node edge. The method may then include initializing the reinitialized graph. The method may further include executing a hybrid algorithm on the initialized graph or on the reinitialized graph, wherein the hybrid algorithm comprises an ant colony optimization algorithm and a genetic algorithm.

According to yet another exemplary embodiment, a computer program product for solving combinatorial optimization problems is provided. The computer program product may include one or more computer-readable storage devices and program instructions stored on at least one of the one or more tangible storage devices, the program instructions executable by a processor. The computer program product may include program instructions to receive a plurality of problem instance parameters associated with a graph. The computer program product may also include program instructions to determine when a dynamic path change indicator exists. The computer program product may then include program instructions to initialize the graph based on the determining the dynamic path change indicator does not exist. The computer program product may further include program instructions to insert a placeholder node and at least one placeholder node edge based on the determining the dynamic path change indicator does exist. The computer program product may also include program instructions to reinitialize the graph with the inserted place holder node and the at least one placeholder node edge. The computer program product may then include program instructions to initialize the reinitialized graph. The computer program product may further include program instructions to execute a hybrid algorithm on the initialized graph or on the reinitialized graph, wherein the hybrid algorithm comprises an ant colony optimization algorithm and a genetic algorithm.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for solving vehicle routing problems using evolutionary computing techniques.

As described previously, solving combinatorial optimization problems, such as the capacitated vehicle routing problem, may require alternative analytical techniques, or combinatorial optimizations, to reach a solution within feasible computational and temporal limits. One method for combinatorial optimization mimics ants' food searching behavior (i.e., ant colony optimization). Ant colony optimization describes virtual ants (i.e. agents) that probabilistically choose paths based on a combination of the virtual pheromones deposited by previous ants and heuristics (e.g., path length).

When applied to a graph having nodes and edges, ants in an ant optimization algorithm may choose what node to visit next based on a combination of the pheromone deposits on the edges and the edge weight (e.g., edge length). Ants may be limited to selecting visible nodes (i.e., adjacent nodes having a single edge linking the ant's current node location and the adjacent nodes) as the next node to traverse. Additionally, ants may deposit pheromones along every edge traversed to influence ant decisions in the future. Once an ant colony optimization iteration completes, the pheromone deposit strength is globally reduced on the edges of the graph to account for evaporation. Shorter (i.e., more optimal) paths may have stronger pheromone deposits and thus may be not be effected as much by evaporation as longer (i.e., less optimal) paths. Due to ant bias for choosing paths with stronger pheromone deposits, shorter paths may be favored and traversed by subsequent ants reinforcing optimal paths while evaporation may lessen the probability that non-optimal paths are used. After completing multiple ant colony optimization iterations, ants may rarely deviate from the more optimal path because of the pheromone deposit strength, therefore indicating a possible solution may have been discovered.

Where the graph that ants will traverse represents a capacitated vehicle routing problem, a node may be designated as the starting node representing the supply depot that the ants, representing delivery trucks, may start from to traverse the graph. The trucks (i.e., ants) may have a fixed carrying capacity and each node other than the depot in the graph may have a capacity requirement that must be fulfilled by the visiting truck. As the truck makes deliveries, the load the truck carries may be reduced by the capacity requirement of the node destination the truck is currently at. Once the truck is no longer carrying enough to service an adjacent node destination, the truck may return to the depot one or more times to be resupplied until the truck has finish servicing each node destination in the graph.

According to the present invention, application of an ant colony optimization algorithm for solving combinatorial optimization problems may be further improved through integration of a genetic algorithm to form a hybrid algorithm. The hybrid algorithm may use elements of a genetic algorithm in conjunction with an ant colony optimization algorithm, such as selecting better performing ants as virtual parent ants to create virtual offspring combining characteristics from two parent ants. By using high performing parent ants and virtual child ants, poor performing ants with ineffective characteristics are disregarded, thus algorithm efficiency may improve and generate an optimal solution faster. Additionally, in order to avoid bias, a subset of the child ants may have a random characteristic mutated.

Figure 1:
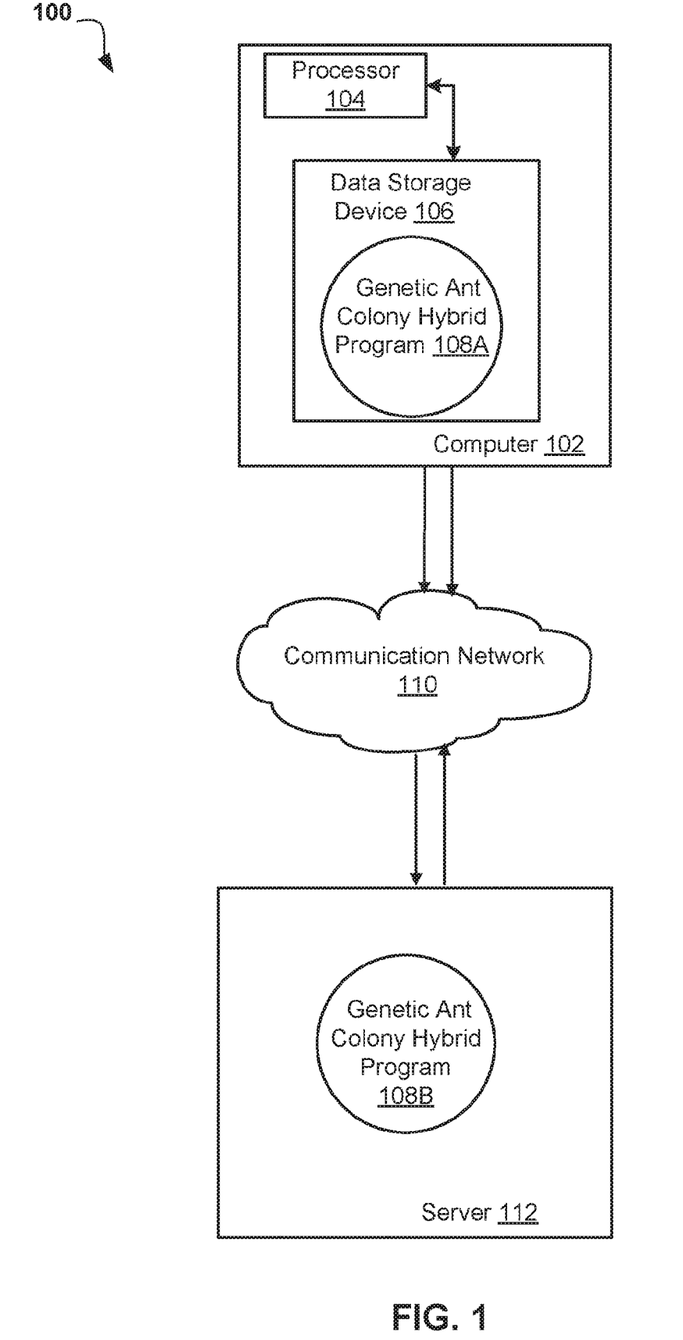
FIG. 1 illustrates a networked computer environment according to at least one embodiment.

Referring now to FIG. 1, an exemplary networked computer environment 100 in accordance with one embodiment is depicted. The networked computer environment 100 may include a computer 102 with a processor 104 and a data storage device 106 that is enabled to run a genetic ant colony hybrid (GACH) program 108A. The networked computer environment 100 may also include a server 112 that is enabled to run a GACH program 108B and a communication network 110. The networked computer environment 100 may include a plurality of computers 102 and servers 112, only one of which is shown for illustrative brevity. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 4, server computer 112 may include internal components 800a and external components 900a, respectively and client computer 102 may include internal components 800b and external components 900b, respectively. Client computer 102 may be, for example, a mobile device, a telephone, a PDA, a netbook, a laptop computer, a tablet computer, a desktop computer, or any type of computing device capable of running a program and accessing a network.

A program, such as a GACH program 108A and 108B may run on the client computer 102 or on the server computer 112. The GACH program 108A and 108B may be used to solve combinatorial optimization problems such as the capacitated vehicle routing problem. The GACH program 108A and 108B is explained in further detail below with respect to FIG. 2.

Figure 2:
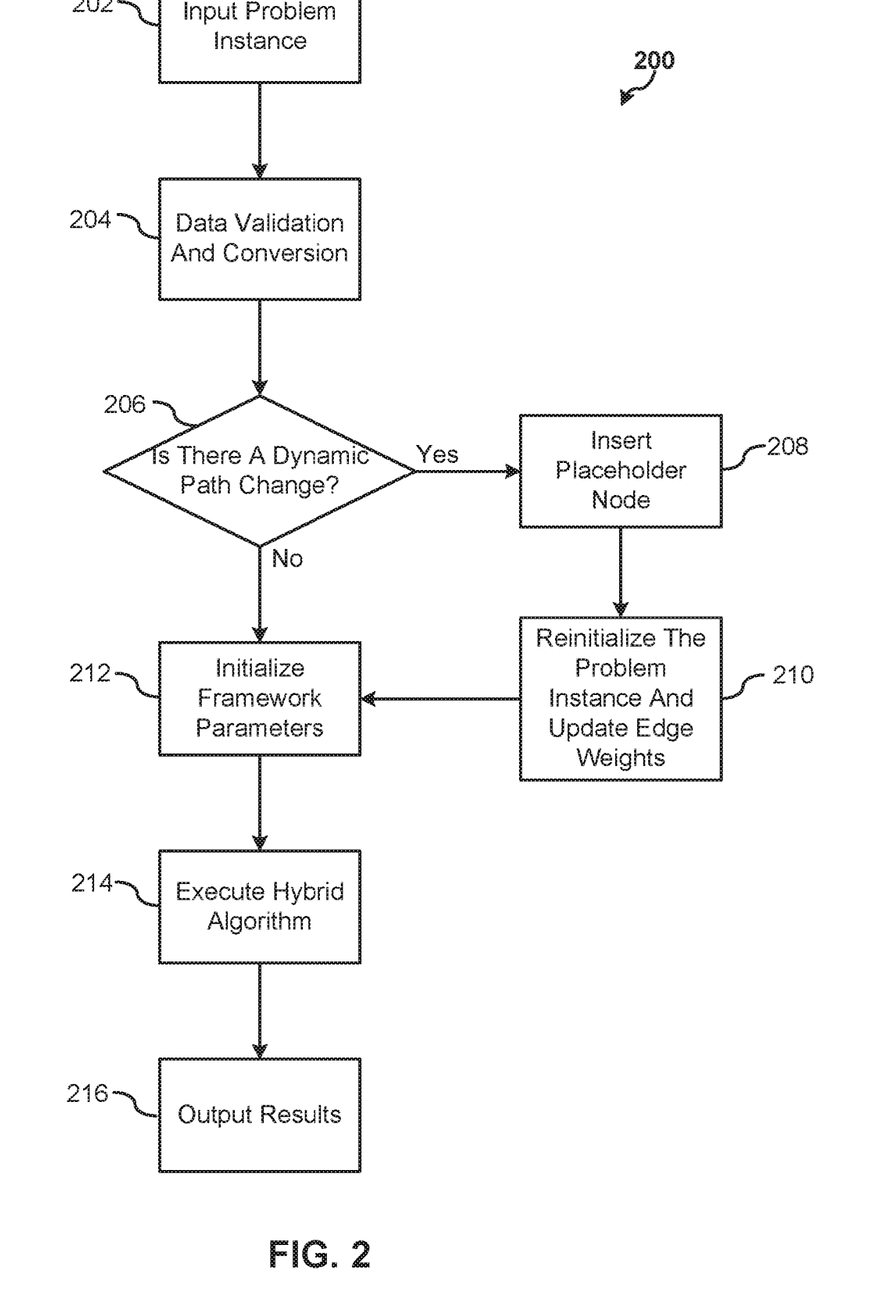
FIG. 2 is an operational flow chart illustrating the process carried out by a genetic ant colony hybrid program according to at least one embodiment.

Referring now to FIG. 2, an operational flow chart illustrating the exemplary process 200 by the GACH program 108A and 108B (FIG. 1) according to at least one embodiment is depicted. At 202, the process 200 may receive problem instance parameters defining a problem instance. According to at least one implementation, problem instance parameters may correspond to a graph including nodes and edges. For example, the graph data may represent a problem instance, such as a capacitated vehicle routing problem, where nodes correspond with delivery destinations and the originating depot, and where edges correspond with roads connecting delivery destinations to other delivery destinations or to the depot. Additionally, edges may be weighted to represent varying road lengths in the problem instance and nodes may have a capacity requirement associated with each node other than the node designated as the depot.

Next at 204, the received problem data is validated and converted for use by the process 200. According to at least one embodiment, problem instance data (e.g., node, edge, edge weight, node capacity requirement, etc.) may be stored in one or more data structures, such as arrays, accessible by the process 200. Furthermore, problem data may be normalized to ensure that the process 200 works properly with problem data of varying sizes. According to at least one implementation, data normalization may include the use of a damping algorithm. Damping may be performed on the problem data each time the process 200 may start by determining the maximum and minimum path lengths and calculating a relative length value. For example, a damping algorithm may include calculating a relative length value by using the following formula:

Relative Length=Path Length−Min Path Length

After the relative length value has been determined, a final path length may be calculated using the following formula:

Final Path Length=Relative Length/(Max Path Length−Min Path Length)

After computing the final path length for each edge, the path length of each edge in the graph may be replaced with the calculated normalized path length (i.e., Final Path Length). According to at least one other implementation, problem data normalization may utilize logarithmic scaling to reduce path distances to a range that may be handled by the process 200. It may be appreciated that other normalization techniques may be utilized by the process 200 including combinations of two or more techniques.

Then at 206, the process 200 may check if a dynamic path change has been indicated. According to at least one embodiment, a dynamic path change may be indicated by a flag variable (i.e., dynamic path change indicator) and by identifying an edge in the problem instance graph that may be removed. For example, a dynamic path change may be indicated to remove an edge in the graph correspond to changing road conditions in a capacitated vehicle routing problem such as a road block in a road connecting two delivery destinations by setting a path change flag and identifying an edge (e.g., edge $E_{BC}$) to be removed. By accommodating dynamic path changes, the process 200 may create an updated vehicle route solution that omits the removed edge without wasting time and computational resources by disregarding previous computation and starting the process 200 anew.

If the process 200 has determined that a dynamic path change indicator exists, at 208 the process 200 may insert a placeholder node with edges connecting the placeholder node in between the two nodes at each end of the removed edge in the graph to maintain graph connectivity. For example, in a graph having nodes A and B connected by edge $E_{AB}$, where edge $E_{AB}$ is not longer traversable, process 200 may remove edge $E_{AB}$ from the graph. A placeholder node Q may then be created having edges $E_{AQ}$ and $E_{QB}$ to maintain connectivity between nodes A and B.

Next at 210, the graph may be reinitialized with the placeholder node (e.g., node Q) and placeholder node edges (e.g., edges $E_{AQ}$ and $E_{QB}$) in place. The process 200 may initialize the characteristics for placeholder edges such that paths that include the placeholder node and placeholder node edges may be disregarded. For example, placeholder node edges may be initialized with very high pheromone evaporation rate values and edge weight values that exceed the greatest edge weight value in the graph. Additionally, a final problem solution computed by the process 200 previously, may be revised by the process 200 if the final problem solution includes the removed one or more edges. The process 200 may revise the final problem solution to include the best problem solution discovered by process 200 previously that does not include the removed one or more edges. Thus, the computing needed to reach a new final problem solution may be reduced by rolling the final problem solution back to a previous best solution and continuing the process 200 from the previous best solution that does not include the removed one or more edges.

However, if there was no dynamic path change indicated at 206, or if a dynamic path change has already been processed at 210, the process 200 may initialize the genetic ant colony hybrid (i.e., GACH) framework parameters at 212 in preparation for executing a hybrid algorithm (e.g., combination of an ant colony optimization algorithm and genetic algorithm). For example, the GACH framework parameters may include: the number of ants, ant characteristic parameters, and iteration limits (e.g., the number of clock cycles or the number of seconds that the process 200 may execute before ending a GACH iteration and how many total GACH iterations may be executed).

The number of ants framework parameter may define the number of virtual ants that may populate an ant pool that may be used to find solutions in each GACH iteration. Each virtual ant in the initial ant pool may be initialized to have the ant characteristics defined by the GACH framework parameters. According to at least one embodiment, each virtual ant may be represented in the process 200 as a data structure (i.e., ant data structure), such as an array of integers, that may store characteristic parameters corresponding to the ant characteristic parameters. Additionally, the data structures initialized to represent the virtual ants may store a problem solution (e.g., a list comprising a sequence of all nodes in the graph wherein each consecutive node has an edge linking the nodes in the graph) corresponding with the order in which the process 200 selected each node in the graph based on the characteristics of the data structure.

According to at least one embodiment, characteristic parameters may include: $\rho$, $\alpha$, $\beta$, EXPLORE, LAY, EVAP, and CAP. The $\rho$ characteristic may represent the persistence of pheromone value changes by a data structure. The $\alpha$ and $\beta$ characteristics may represent positive real numbers whose values determine the relative importance of pheromone value versus heuristic information that may influence the process 200 to choose one node over another for a data structure. The EXPLORE characteristic may represent a value indicating the probability that the process 200 may use explore or exploit strategies to select adjacent nodes. The LAY characteristic may represent the amount a data structure alters pheromone values along the edges connecting the nodes in a data structure's problem solution. The EVAP characteristic may correspond with a multiplier indicating the fraction of pheromone that evaporates at the end of each GACH iteration (i.e., problem solving iteration). The CAP characteristic may represent a value indicating the carrying capacity of the data structure to meet the capacity requirements of the nodes in the graph.

At 214, the process 200 may execute a hybrid algorithm on the initialized graph and initialized framework parameters. Hybrid algorithm execution will be discussed in detail below with reference to FIG. 3.

Then, at 216, the process 200 may output the results of the hybrid algorithm (i.e., final problem solution) the process 200 received to provide for a user. According to at least one embodiment, the hybrid algorithm results may include a solution to process deliverables by truck (e.g., in the case of a capacitated vehicle routing problem) or for any other problem the process 200 was employed to solve. For example, an output graph may be displayed for the user based on the information compiled through all hybrid algorithm iterations, displaying the number of ants versus path cost for problem solutions such that a user solving a capacitated vehicle routing problem may determine what vehicle size is needed.

Figure 3:
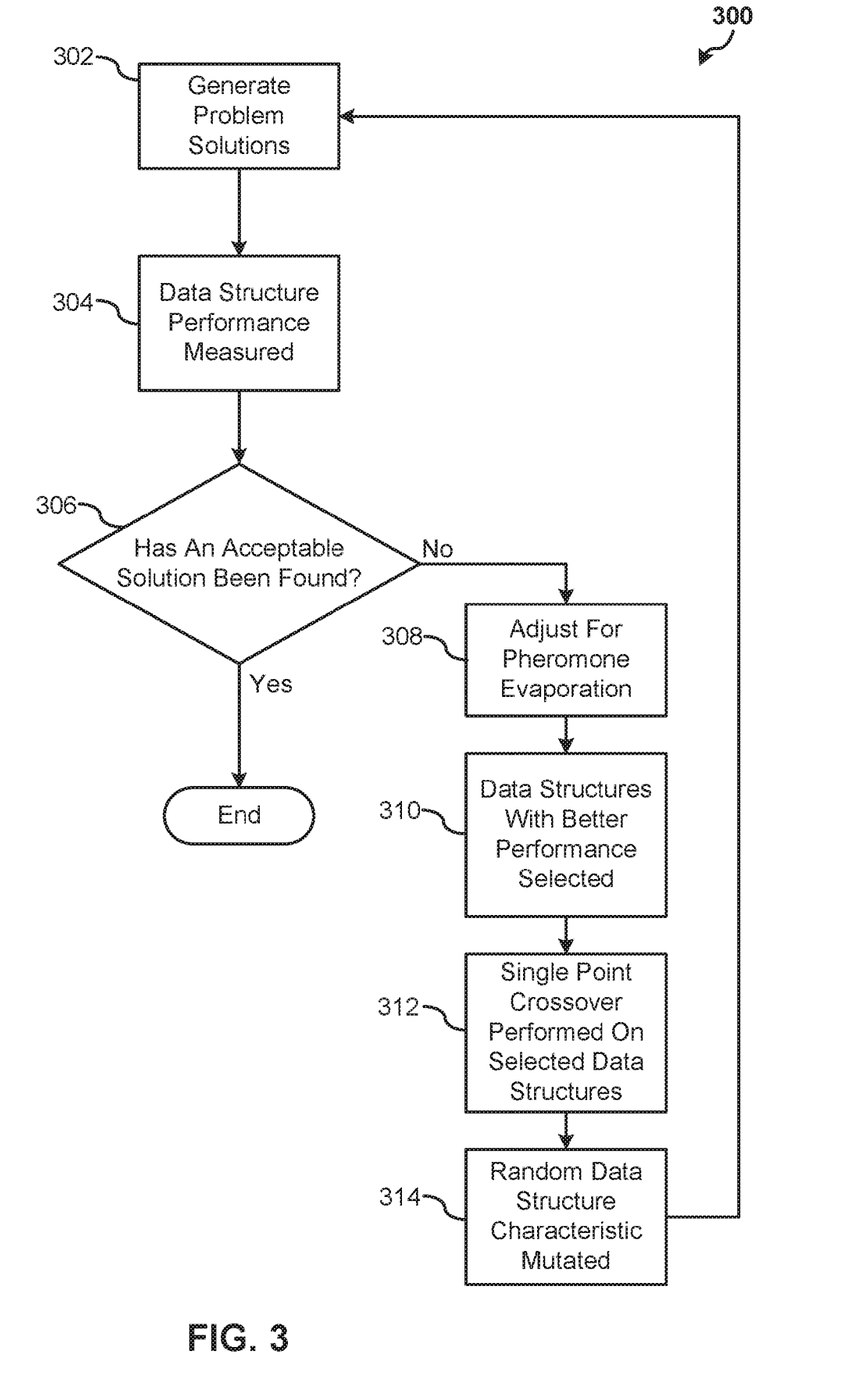
FIG. 3 is an operational flow chart illustrating the hybrid algorithm process according to at least one embodiment.

Referring now to FIG. 3, an operational flow chart illustrating the exemplary hybrid algorithm 300 according to at least one embodiment is depicted. At 302, the hybrid algorithm 300 may generate problem solutions for each data structure in the ant pool. According to at least one embodiment, the hybrid algorithm 300 may iteratively select a data structure to generate a complete problem solution (e.g., a list comprising a sequence of all nodes in the graph wherein each consecutive node has an edge linking the consecutive nodes in the graph) until each data structure in the ant pool contains a complete problem solution.

The hybrid algorithm 300 may use the currently selected data structure to determine the next node to add to the selected data structure's problem solution based on either an explore or exploit strategy. In this manner, the hybrid algorithm 300 may select adjacent nodes in the graph to generate a problem solution in lieu of a virtual ant choosing adjacent nodes to traverse to generate a problem solution in an ant colony optimization algorithm. The hybrid algorithm 300 may choose to use an explore strategy or exploit strategy for selecting the next node in the selected data structure's problem solution by generating a random number and comparing the generated random number with the EXPLORE characteristic stored in the selected data structure.

For example, if a generated random number is less than the selected data structure's EXPLORE characteristic, the hybrid algorithm 300 may use exploit state transition rules to choose the next node to add to the selected data structure's problem solution. Conversely, where the generated random number is equal to or greater than the selected data structure's EXPLORE characteristic, the hybrid algorithm 300 may use explore state transition rules to choose the next node to add to the selected data structure's problem solution. After each new node is added to the selected data structure's problem solution, a new random number may be generated and compared with the selected data structure's EXPLORE characteristic to select which state transition rule the hybrid algorithm 300 will use to select a subsequent node.

According to at least one implementation, an exploit state transition rule may determine an adjacent node for the hybrid algorithm 300 to select based on the pheromone value associated with the edge connecting the last node added to the selected data structure's problem solution and an adjacent node that may not already be in the selected data structure's problem solution. Additionally, the exploit state transition rule may only allow the hybrid algorithm 300 to select an adjacent node where the capacity requirement associated with the adjacent node is equal to or less than the selected data structure's remaining carrying capacity (i.e., CAP characteristic).

For example, a data structure having a remaining carrying capacity of four and where the last node in the data structure's problem solution is node i, may have three adjacent nodes that are not in the data structure's problem solution. The three adjacent nodes: X, Y and Z, may have capacity requirements of four, five and three respectively. The pheromones values associated edges $E_{iX}$, $E_{iY}$ and $E_{iZ}$ may be $\tau_{iX}$, $\tau_{iY}$ and $\tau_{iZ}$ respectively where $\tau_{iY} > \tau_{iZ} > \tau_{iX}$. While the edge leading to node Y has the highest associated pheromone value, the data structure cannot meet the capacity requirement for node Y and thus the hybrid algorithm 300 may not select node Y add to the data structure's problem solution. However, the data structure can meet the capacity requirements of nodes X and Z. Since the edge leading to node Z has a higher associated pheromone value than the edge leading to node X, the hybrid algorithm 300 may select node Z to add to the data structure's problem solution.

Furthermore, after node Z is added to the data structure's problem solution, the data structure's carrying capacity may be reduced by the capacity requirement of node Z (i.e., three), thus resulting in the data structure's carrying capacity being reduced to one. If a data structure does not have enough carrying capacity left to move to any adjacent node, the data structure's carrying capacity may be replenished to the starting carrying capacity value (e.g., twenty) and the hybrid algorithm 300 may resume generation of a problem solution. The number of times a data structure's carrying capacity is replenished in the course of generating a problem solution may be recorded for use in evaluating the data structure's performance. Replenishing the data structure's carrying capacity may represent a delivery truck, returning to the starting depot to refill the truck's carrying capacity and resume servicing delivery destinations (i.e., nodes) from the delivery destination where the truck was previously.

When the hybrid algorithm 300 has determined to select a new node to add to a problem solution based on an explore strategy, the hybrid algorithm 300 may choose the next node to add to the problem solution based on the value of the edge leading to an adjacent node relative to the other edge choices available to the hybrid algorithm 300. According to at least one implementation, an explore state transition rule may be used by the hybrid algorithm 300 to select an adjacent node based on evaluating the edge weight value and pheromone value associated with the edges linking the data structure's current location (i.e., the last node added to the data structure's problem solution) and adjacent nodes. Tunable parameters (e.g., characteristics α and β) allow for the biases of the explore state transition rule to be adjusted to alter how the hybrid algorithm 300 chooses nodes to add to a problem solution. According to at least one implementation, the hybrid algorithm 300 may select the next node to add to a problem solution based on an explore state transition rule such as:

$$p([i,j]) \propto \tau_{ij}^{\alpha}/d_{ij}^{\beta} + \tau_0$$

Where p([i,j]) represents the probability of choosing [i,j] as the next move from the data structure's current location (i.e., node i) and $d_{ij}$ represents the heuristic value of the edge such as the edge weight. Once the probability for each possible next move has been determined, a random number may be generated and utilized by the hybrid algorithm 300 in conjunction with the calculated probability for each possible next node to add to a problem solution to choose the next node to add.

According to at least one embodiment, the hybrid algorithm 300 may iteratively select nodes to add to a problem solution for an data structure until the data structure has a complete problem solution. For example, the hybrid algorithm 300 may receive graph G having nodes A, B, C, and D, and edges $E_{AD}$, $E_{AC}$, $E_{AB}$, $E_{DC}$, $E_{CB}$. The hybrid algorithm 300 may iteratively construct a problem solution for the data structure comprising a list of graph nodes A, D, C, and B that may be implemented as a data structure (e.g., a linked list) stored in the data structure (e.g., an array). The list of nodes comprising the problem solution may represent the hybrid algorithm 300 starting from node A and selecting adjacent node D along edge $E_{AD}$. In the next problem solving iteration, the hybrid algorithm 300 selected node C, adjacent to node D, along edge $E_{DC}$. In the following iteration, the hybrid algorithm 300 then selected node B, adjacent to node C, along edge $E_{BC}$. After selecting node B, the hybrid algorithm 300 may determine that each node in graph G is present in the data structure's problem solution and thus determine that the problem solution of the data structure is a complete problem solution. Additionally, the hybrid algorithm 300 may then generate a complete problem solution for the remaining data structures in the ant pool.

The hybrid algorithm 300 may also locally modify the pheromone values associated with the edges of the graph connecting the nodes in the data structure's problem solution. The edges of the graph connecting the nodes in the data structure's problem solution may represent a path a virtual ant made through the graph in an ant colony optimization algorithm. The virtual pheromone that the virtual ant deposits along the virtual ant's path may be represented by the pheromone value associated with each graph edge in a problem solution. According to at least one implementation, the local pheromone value τ associated with edge (i,j) may be updated by the following formula:

$$\tau_{ij}^{new}=(1-\rho)\cdot\tau_{ij}^{old}+\rho\cdot\tau_0$$

Where $\tau_0$ is the initial pheromone value (e.g., a small constant). The local pheromone value for each edge in each data structure's problem solution may also be updated according to the above formula.

Next at 304, the performance of each data structure may be measured by an objective function after the hybrid algorithm 300 has finished generating complete problem solutions for each data structure in the ant pool. According to at least one implementation, each data structure's performance may be evaluated using the following formula:

Ant Performance=Σ(Path Cost)+
ϕ·COST_CONSTANT

Where ϕ may be the number of times the data structure had to revisit the node representing the depot and where COST_CONSTANT may be a value greater than the maximum edge weight of any edge in the graph. Additionally, the Path Cost value may represent the sum of the edge weight values associated with each edge connecting the nodes in the data structure's problem solution according to the order the nodes are arranged in the problem solution. According to the above formula, data structures may be penalized for the number of times the data structure had to return to the depot, thus data structures that are more efficient (i.e., return to the depot fewer times to resupply) may receive better (i.e., lower) Ant Performance values.

After objectively evaluating each data structure, the current GACH iteration best path solution may be determined out of the problem solutions stored in each data structure in the ant pool by the following formula:

Current GACH Iteration Best Path=Minimum[For
All Data Structures[Σ(Path Cost)+
ϕ·COST_CONSTANT]]

According to at least one embodiment, the problem solution stored in each data structure may be saved in a data repository, such as a database. The data repository containing previous problem solutions may be used for the purpose of rolling back the final problem solution in the event of a path change to a previous problem solution that does not contain the removed edge as described at 210 (FIG. 2).

Then at 306, the hybrid algorithm 300 may determine if an acceptable solution has been found. According to at least one embodiment, an acceptable solution may be found if the path cost of the global best path solution (i.e., the most optimal problem solution found in any previous GACH iteration) compared with the path cost of the Current GACH Iteration Best Path solution falls within a predefined allowed error rate. If comparing the best path solutions of successive GACH iterations shows minimal differences in the problem solutions, any further GACH iterations may be unlikely to produce substantial gains. Thus, the process 200 may determine based on the predefined error rate to stop further GACH iterations rather than continue to use resources for computing more GACH iterations. Additionally, if the Current GACH Iteration Best Path solution has a lower path cost than the global best path solution, the global best path solution may be updated with the Current GACH Iteration Best Path solution. The hybrid algorithm 300 may also determine that an acceptable solution has been found if the hybrid algorithm 300 has reached predefined temporal or computational limits (e.g., the number of GACH iterations completed equals the maximum number of GACH iterations allowed).

If an acceptable solution has been found at 306, the hybrid algorithm 300 may provide the current global best path solution to the process 200 (FIG. 2) as a final problem solution in order for the process 200 (FIG. 2) to output to a user as described at 216 (FIG. 2) above.

However, if an acceptable solution has not yet been found, the hybrid algorithm 300 may begin to prepare for the next GACH iteration by updating the pheromone values associated with each edge of the graph to account for pheromone evaporation at 308. According to at least one embodiment, pheromone evaporation may be calculated based on the ρ, LAY, and EVAP characteristics of the data structures. Additionally, the current global best path solution w, and worst solution of the current GACH iteration (i.e., C_MAX) may be used to calculate pheromone evaporation. The C_MAX value may represent the worst solution based on total distance (i.e., most time spent, hence most affected by evaporation). For example, pheromone evaporation may be calculated using the following formula:

$$\tau_{ij}^{new}=\tau_{ij}^{old}(\rho+(1-\rho)\cdot LAY\cdot EVAP\cdot(C\_MAX-\psi)/\psi)$$

Pheromone evaporation may thus decrease pheromone values associated with undesirable solutions, biasing the hybrid algorithm 300 in the next GACH iteration to select nodes that generate problem solutions that are similar to more efficient solutions rather than inefficient solutions.

Next at 310, data structures with better performance may be selected as parent data structures for use as the basis for generating a next generation of child data structures in the next GACH iteration. According to at least one embodiment, the calculated Ant Performance value corresponding to each data structure in the ant pool may be sorted from lowest value to greatest value. The data structures with the lowest calculated Ant Performance values (i.e., better performing data structures) may be selected as parent data structures for creating the next generation of child data structures that may be used in the next GACH iteration. Data structures that are not selected as parent data structures may be eliminated or not considered for use in the next GACH iteration's ant pool.

Then at 312, the data structures selected as parent data structures may have a single point crossover performed to generate child data structures. In order to maintain the same number of data structures in the ant pool at each GACH iteration, the hybrid algorithm 300 may generate enough child data structures such that the number of parent data structures and child data structures combined equals the number of ants GACH framework parameter. According to at least one embodiment, parent data structures may be randomly grouped into pairs of parent data structures. A single point crossover may then be performed on each pair of parent data structures to generate a pair of child data structures. A random number may be generated to select the crossover point.

For example, for data structures having six characteristics (e.g., ρ, α, β, EXPLORE, LAY, and EVAP) considered for crossover, the number two may be randomly generated by the hybrid algorithm 300 as the crossover point for a pair of parent data structures (e.g., $P_1$ and $P_2$). Parent data structure $P_1$ may have the characteristics $\rho_1$, $\alpha_1$, $\beta_1$, $EXPLORE_1$, $LAY_1$, and $EVAP_1$ and parent data structure $P_2$ may have the characteristics $\rho_2$, $\alpha_2$, $\beta_2$, $EXPLORE_2$, $LAY_2$, and $EVAP_2$.

With a crossover point of two, and six total characteristics, two child data structures may be generated (e.g., $C_1$ and $C_2$) having the first two characteristics from one parent data structure the last four characteristics from the other parent. Thus, the resulting generated child data structure $C_1$ of parent data structures $P_1$ and $P_2$ may have the characteristics $\rho_1$, $\alpha_1$, $\beta_2$, $EXPLORE_2$, $LAY_2$, and $EVAP_2$. Generated child data structure $C_2$ of parent data structure $P_1$ and $P_2$ may have the characteristics $\rho_2$, $\alpha_2$, $\beta_1$, $EXPLORE_1$, $LAY_1$, and $EVAP_1$. The CAP (i.e., carrying capacity) characteristic may be ignored during crossover as the CAP may be a constant among all data structures for all GACH iterations.

At 314, child data structure characteristics may be randomly chosen by the hybrid algorithm 300 for mutation. According to at least one embodiment, a subset of child data structures may be chosen randomly for mutation from all child data structures. Additionally, child data structures selected may have the same single characteristic (e.g., p) chosen at random for mutation. The CAP characteristic may be ignored for mutation because the CAP may be a constant defined in the initial problem instance parameters.

Characteristic mutation may be implemented as fixed formula to flip the value of a characteristic. For example, child data structure $C_3$ may have characteristic $\rho_3$ randomly chosen for mutation. If $\rho$ represents a value between zero and one and where $\rho_3$ has value of 0.35 before mutation, $\rho_3$ may flip to the value of 0.65 after mutation. All other child data structures selected for mutation in the current GACH iteration may have the same characteristic (e.g., $\rho$) flipped. Random mutation may be performed to avoid reaching a local maximum solution. Once characteristic mutation is complete, the hybrid algorithm 300 may return to 302 for the next GACH iteration where the ant pool used to generate problem solutions may include parent data structures, child data structures, and mutated child data structures.

Figure 4:
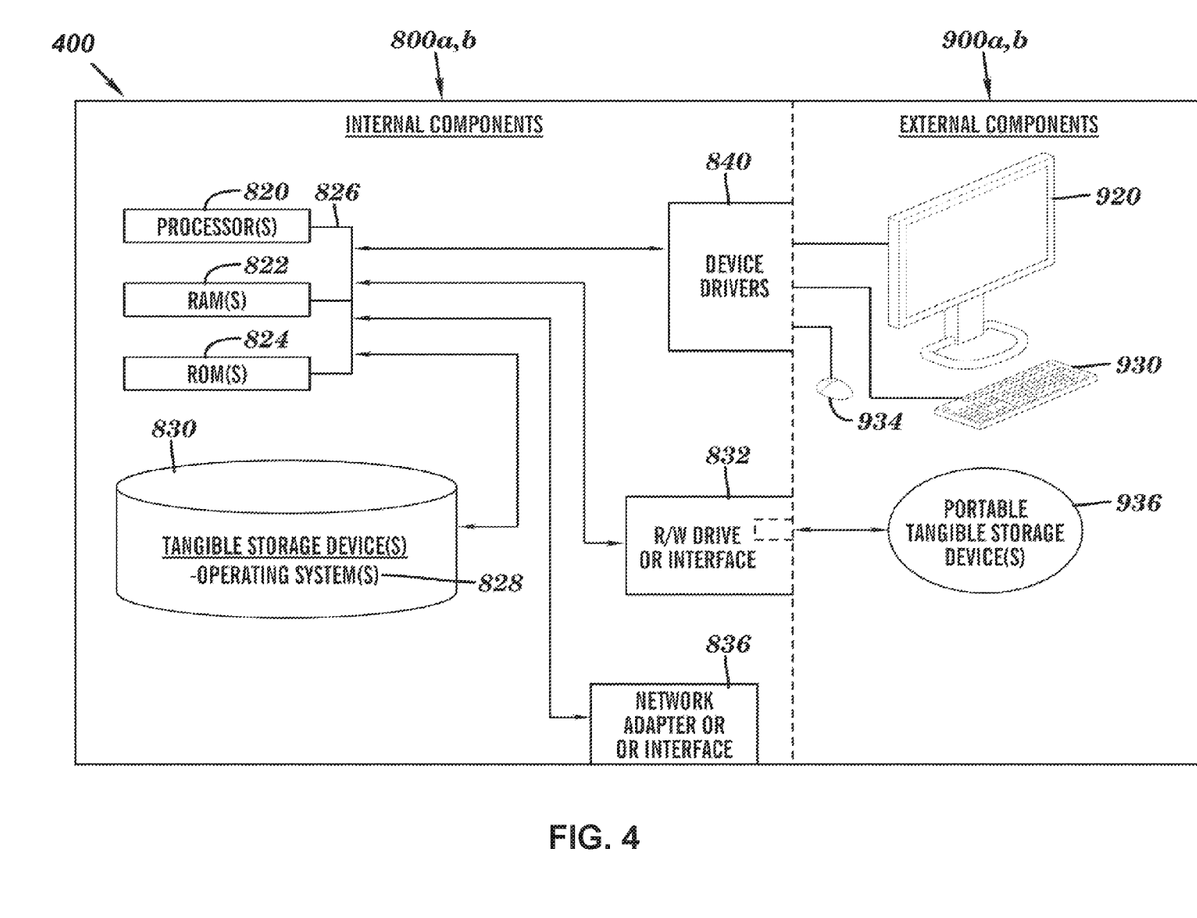
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 800 a, b and external components 900 a, b illustrated in FIG. 4. Each of the sets of internal components 800 a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs such as a GACH program 108A and 108B (FIG. 1) corresponding to process 200 (FIG. 2), may be stored on one or more computer-readable tangible storage devices 830 for execution by one or more processors 820 via one or more RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b also includes a R/W drive or interface 832 to read from and write to one or more portable computer-readable tangible storage devices 936 such as a CD-ROM, DVD, memory stick, magnetic tape, magnetic disk, optical disk or semiconductor storage device. The GACH program 108A and 108B (FIG. 1) can be stored on one or more of the respective portable computer-readable tangible storage devices 936, read via the respective R/W drive or interface 832 and loaded into the respective hard drive 830.

Each set of internal components 800 a, b may also include network adapters (or switch port cards) or interfaces 836 such as a TCP/IP adapter cards, wireless wi-fi interface cards, or 3G or 4G wireless interface cards or other wired or wireless communication links. The GACH program 108A (FIG. 1) in client computer 102 (FIG. 1) and the GACH program 108B (FIG. 1) in network server computer 112 (FIG. 1) can be downloaded from an external computer (e.g., server) via a network (for example, the Internet, a local area network or other, wide area network) and respective network adapters or interfaces 836. From the network adapters (or switch port adaptors) or interfaces 836, the GACH program 108A (FIG. 1) in client computer 102 (FIG. 1) and the GACH program 108B (FIG. 1) in network server computer 112 (FIG. 1) are loaded into the respective hard drive 830. The network may comprise copper wires, optical fibers, wireless transmission, routers, firewalls, switches, gateway computers and/or edge servers.

Each of the sets of external components 900 a, b can include a computer display monitor 920, a keyboard 930, and a computer mouse 934. External components 900 a, b can also include touch screens, virtual keyboards, touch pads, pointing devices, and other human interface devices. Each of the sets of internal components 800 a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for solving combinatorial optimization problems, the method comprising:

receiving a plurality of problem instance parameters associated with a graph, wherein the graph comprises a plurality of nodes and a plurality of edges, wherein each edge of the plurality of edges links two nodes of the plurality of nodes, and wherein at least one node of the plurality of nodes in the graph has an associated capacity requirement value;

determining when a dynamic path change indicator exists;

initializing the graph based on the determining the dynamic path change indicator does not exist;

inserting a placeholder node and at least one placeholder node edge based on determining the dynamic path change indicator does exist;

reinitializing the graph with the inserted place holder node and the at least one placeholder node edge;

initializing the reinitialized graph;

initializing an ant pool, the ant pool comprising a plurality of data structures, wherein each data structure of the plurality of data structures has a plurality of characteristics and wherein the plurality of characteristics includes a carrying capacity characteristic, a pheromone persistence characteristic, a relative pheromone importance characteristic, and an explore strategy selection characteristic;

executing the problem solving iteration on the initialized graph or on the reinitialized graph, wherein a problem solution is generated for the each data structure of the plurality of data structures based on the plurality of characteristics and the capacity requirement associated with adjacent nodes and the carrying capacity of each data structure, and wherein the problem solving iteration includes selecting an adjacent node to add to the problem solution, the adjacent node being linked to a current node by an edge of the plurality of edges, and wherein the edge links the current node to the adjacent node, and wherein the selecting the adjacent node is based on an edge weight and a pheromone value associated with each edge of the plurality of edges linking the current node with the adjacent node, and wherein the problem solving iteration adds adjacent nodes to the problem solution until the problem solution contains each node of the graph;

sorting the ant pool based on a path cost value associated with the problem solution of the each data structure of the plurality of data structures, the sorting ranging from a lowest path cost solution to a highest path cost solution, wherein the path cost value is based on the edge weight associated with each edge in the problem solution;

selecting at least two data structures from the sorted ant pool having a low path cost solution;

initializing a plurality of child data structures having at least one characteristic based on the plurality of characteristics of each of the selected at least two data structures;

mutating at least one random characteristic associated with each child data structure of the plurality of child data structures by using a fixed formula to flip the value of the at least one random characteristic; and reinitializing the ant pool wherein the reinitialized ant pool comprises the selected at least two data structures and the plurality of child data structures for use in a subsequent problem solving iteration.

* * * * *